US012744974B2

(12) United States Patent
Khalil et al.

(10) Patent No.: US 12,744,974 B2
(45) Date of Patent: Sep. 22, 2026

(54) METHODS AND DEVICES FOR GENERATING CUSTOMIZED VIDEO SEGMENT BASED ON CONTENT FEATURES

(71) Applicant: HUAWEI TECHNOLOGIES CO., LTD., Shenzhen (CN)

(72) Inventors: Md Ibrahim Khalil, Kanata (CA); Peng Dai, Shenzhen (CN); Hanwen Liang, Kanata (CA); Lizhe Chen, Kanata (CA); Varshanth Ravindra Rao, Kanata (CA); Juwei Lu, Kanata (CA); Songcen Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 43 days.

(21) Appl. No.: 18/656,705

(22) Filed: May 7, 2024

(65) Prior Publication Data

US 2024/0292073 A1 Aug. 29, 2024

Related U.S. Application Data

(63) Continuation of application No. PCT/CN2022/070589, filed on Jan. 6, 2022.

(51) Int. Cl.
*H04N 21/8549* (2011.01)
*G06V 10/70* (2022.01)
(Continued)

(52) U.S. Cl.
CPC ......... *H04N 21/8549* (2013.01); *G06V 10/70* (2022.01); *G06V 20/46* (2022.01); *G06V 20/49* (2022.01); *G06F 3/0484* (2013.01)

(58) Field of Classification Search
CPC .... H04N 21/8549; G06V 10/70; G06V 20/46; G06V 20/49; G06F 3/0484; G06F 16/7328; G06F 16/735
(Continued)

(56) References Cited

U.S. PATENT DOCUMENTS 9,646,227 B2 * 5/2017 Suri .................... G06V 10/774
9,704,231 B1 * 7/2017 Kulewski .............. G06V 10/40
(Continued)

FOREIGN PATENT DOCUMENTS

CN 110191358 A 8/2019
CN 111126262 A 5/2020
(Continued)

OTHER PUBLICATIONS

English Translation of Chinese Publication CN112445935 Mar. 2021 (Year: 2021).*
(Continued)

*Primary Examiner* — Loi H Tran

(57) ABSTRACT

Methods and devices for generating a customized video segment from a video are disclosed. The video is partitioned into video segments. For each respective video segment, a respective set of scores is computed, where each score represents a respective content feature in the respective video segment. A respective weighted aggregate score is computed for each respective video segment by applying, to each respective set of scores, a common set of weight values. A selected video segment is outputted as the customized video segment, where the selected video segment is selected from one or more high-ranked video segments having high-ranked weighted aggregate scores.

19 Claims, 6 Drawing Sheets

(51) Int. Cl.
*G06V 20/40* (2022.01)
*G06F 3/0484* (2022.01)

(58) Field of Classification Search
USPC .......................................................... 386/278
See application file for complete search history.

(56) References Cited

U.S. PATENT DOCUMENTS

| | | | | |
|---|---|---|---|---|
| 9,782,678 | B2 | 10/2017 | Long et al. | |
| 11,468,675 | B1 * | 10/2022 | Agarwal | G06Q 30/0643 |
| 11,763,564 | B1 * | 9/2023 | Sadoughi Nourabadi | G06V 20/41 386/241 |
| 2016/0070962 | A1 * | 3/2016 | Shetty | G06F 16/7834 382/225 |
| 2019/0297367 | A1 | 9/2019 | Osminer | |
| 2021/0125359 | A1 * | 4/2021 | Dolce | G06V 20/47 |
| 2022/0215560 | A1 * | 7/2022 | Ji | G06T 7/90 |
| 2023/0110002 | A1 * | 4/2023 | Luo | G06V 40/169 382/103 |

FOREIGN PATENT DOCUMENTS

| | | | |
|---|---|---|---|
| CN | 111698554 | A | 9/2020 |
| CN | 112445935 | A | 3/2021 |
| WO | 2019293869 | A1 | 10/2019 |

OTHER PUBLICATIONS

English Translation of Chinese Publication CN111783731A Oct. 2020 (Year: 2020).*
Chinese Publication CN111078943 Apr. 2020 (Year: 2020).*
English translation of Chinese Publication CN113516050 Oct. 2021 (Year: 2021).*
English translation of Chinese Publication CN111738173 Oct. 2020 (Year: 2020).*
International Search Report, WO2023/130326 A1, Jul. 13, 2023.
Subramanian et al., "Automatically detect sports highlights in video with Amazon SageMaker", Amazon Machine Learning, Amazon SageMaker, Artificial Intelligence, Sports, Nov. 12, 2021.

* cited by examiner

METHODS AND DEVICES FOR GENERATING CUSTOMIZED VIDEO SEGMENT BASED ON CONTENT FEATURES

CROSS-REFERENCE TO RELATED APPLICATIONS

This application is a continuation of International Application No. PCT/CN2022/070589 filed Jan. 6, 2022, the contents of which is incorporated herein in its entirety.

FIELD

The present disclosure is related to generating a customized video segment from a longer video, where the video segment may be customized based on content features that may be selected based on user inputs.

BACKGROUND

There are currently large numbers of videos available, for example via an online search, for a user to view. With such a large number of videos available, it is difficult for a casual user to easily identify which video is worth viewing, or which moment within a selected video is of particular interest. Typically, when a user searches for videos, the user is provided with short previews (e.g., a one second portion) of each video, to help the user determine whether the video is worth viewing. However, such previews may be defined by whomever generated the video, and may not suit the user's interest. Further, the preview that is defined for a given video may be selected manually (e.g., by whomever generated the video) and may not be a good representation of the main point of interest in the video.

Some existing solutions aim to select video segments that match a user's text query. However, this requires the user to know ahead of time what content to query. For example, a user may simply want to see an interesting moment captured in the video, without knowing exactly what content is in the interesting moment. Other existing solutions do not allow customization of the video segment for each user, or requires extensive profiling of the user before customization is possible.

Accordingly, it would be useful to provide a solution that enables generation of a customizable video segment from a longer video.

SUMMARY

In various examples, the present disclosure describes methods and devices for generating a customized video segment from a longer video, where the video segment is customized by scoring various content features and ranking the video segments by a weighted aggregate score. In some examples, user input may be used to determine weight values for computing weighted aggregate score. In some examples, the video segment may be customized based on similarity to a user-submitted video segment. The technical effect is that a customized video segment is outputted, which can be customized to user preferences. This also provides the technical advantage that a customized video segment may be generated from a longer video, without requiring extensive user input or user profiling. Another technical advantage is that generation of video segments (e.g., a preview clip) may be more automated without sacrificing customizability.

Examples of the present disclosure may provide a modular solution for generating customized video segments. By modular solution, it is meant that examples of the present disclosure may not be specific to any one video platform. For example, examples of the present disclosure may not require information from a user profile maintained on a particular platform, and may not require any video metadata or formatting specific to any particular platform. This provides the technical advantage that examples of the present disclosure may be implemented in a variety of devices and systems, including cloud-based video services, workstations, personal devices, etc.

In an example aspect, the present disclosure describes a method for generating a customized video segment from a video. The method includes: computing, for each respective video segment of one or more video segments of the video, each video segment having two or more frames, a respective set of scores, each score representing a respective content feature in the respective video segment; computing a respective weighted aggregate score for each respective video segment by applying, to each respective set of scores, a common set of weight values; and outputting a selected video segment as the customized video segment, the selected video segment being selected from one or more high-ranked video segments having high-ranked weighted aggregate scores.

In an example of the preceding example aspect of the method, the selected video segment may be the high-ranked video segment having a highest ranked weighted aggregate score.

In an example of any one of the preceding example aspects of the method, the method may further include: receiving, from a user device, user input including a selection of one or more weight values of the common set of weight values.

In an example of any one of the preceding example aspects of the method, the method may further include: receiving, from a user device, user input including a user-submitted query; comparing a query feature vector representing features of the user-submitted query with a respective video segment feature vector representing features of each respective high-ranked video segment; and selecting the selected video segment to be the high-ranked video segment represented by the video segment feature vector having a highest similarity with the query feature vector.

In an example of any one of the preceding example aspects of the method, the method may further include: prior to outputting the selected video segment, providing output to the user device to cause the user device to provide a preview of the selected video segment together with a visual indication of the weighted aggregate score for the selected video segment.

In an example of the preceding example aspect of the method, the method may further include: in response to a change in the user input, recomputing the weighted aggregate scores for each video segment and updating selection of the selected video segment; and updating the preview based on the updated selection of the selected video segment and updating the visual indication based on the recomputed weighted aggregate score.

In an example of any one of the preceding example aspects of the method, outputting the selected video segment may include: computing a respective frame difference between a start and an end frame of each respective high-ranked video segment; and selecting the selected video segment to be a high-ranked video segment having a respective frame difference that falls within a defined difference threshold.

In an example of any one of the preceding example aspects of the method, outputting the selected video segment may include: computing a frame difference between a start and an end frame of the selected video segment; in response to the frame difference exceeding a defined difference threshold, defining a frame previous to the end frame as a new end frame or defining a frame following the start frame as a new start frame; and repeating the computing and the defining until the frame difference falls within the defined difference threshold.

In an example of any one of the preceding example aspects of the method, computing the respective set of scores for each respective video segment may include, for a given video segment: generating each respective score in the set of scores by processing the given video segment using a respective trained content feature extraction model.

In an example of any one of the preceding example aspects of the method, the respective trained content feature extraction model may include at least one of: a trained action prediction model; a trained emotion prediction model; a trained cheering prediction model; a trained speed detection model; or a trained loop detection model.

In an example of any one of the preceding example aspects of the method, the method may further include: partitioning the video into the one or more video segments by computing an amount of change between every pair of two consecutive frames of the video; and defining a start frame of a video segment when the computed amount of change exceeds a defined scene change threshold.

In an example of any one of the preceding example aspects of the method, the method may further include: prior to outputting the selected video segment as the customized video segment, detecting a region of interest (ROI) in the selected video segment and zooming in on the ROI in the selected video segment.

In an example of any one of the preceding example aspects of the method, the method may further include: prior to outputting the selected video segment as the customized video segment, defining a plurality of frames at a start of the selected video segment as variable start frames or defining a plurality of frames at an end of the selected video segment as variable end frames; and outputting the customized video segment to have a variable length, wherein the variable length is variable based on a random selection of one of the variable start frames as a first frame of the customized video segment or a random selection of one of the variable end frames as a last frame of the customized video segment.

In an example of any one of the preceding example aspects of the method, the customized video segment may be outputted in an animated GIF format.

In another example aspect, the present disclosure describes a computing device including: a processing unit configured to execute instructions to cause the computing device to perform any one of the preceding example aspects of the method.

In another example aspect, the present disclosure describes a non-transitory computer readable medium storing instructions thereon, wherein the instructions are executable by a processing unit of a computing device to cause the computing device to perform any one of the preceding example aspects of the method.

In another example aspect, the present disclosure describes a computer readable medium storing instructions thereon, wherein the instructions are executable by a processing unit of a computing device to cause the computing device to perform any one of the preceding example aspects of the method.

In another example aspect, the present disclosure describes a computer program executable by a computing device to cause the computing device to perform any one of the preceding example aspects of the method.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

In various examples, the present disclosure describes methods and devices for generating a customized video segment from a longer video. In particular, examples of the present disclosure may enable generation of video "highlights" or video "previews" from a longer video, which correspond to a moment of interest in the video. For example, if the video includes a sports game, examples of the present disclosure may enable generation of a video segment that captures an exciting moment in the sports game, such as a goal.

Examples of the present disclosure enables a user to provide input (e.g., via selection of weight values for computing a weighted aggregate score, or via a user-submitted video segment) to enable the generated video segment to be customized to the user's preference. Methods and devices of the present disclosure may provide an end-to-end solution, meaning that no pre-processing of the longer video (e.g., video segmentation) and no post-processing of the outputted video segment (e.g., video looping) may be necessary.

Figure 1:
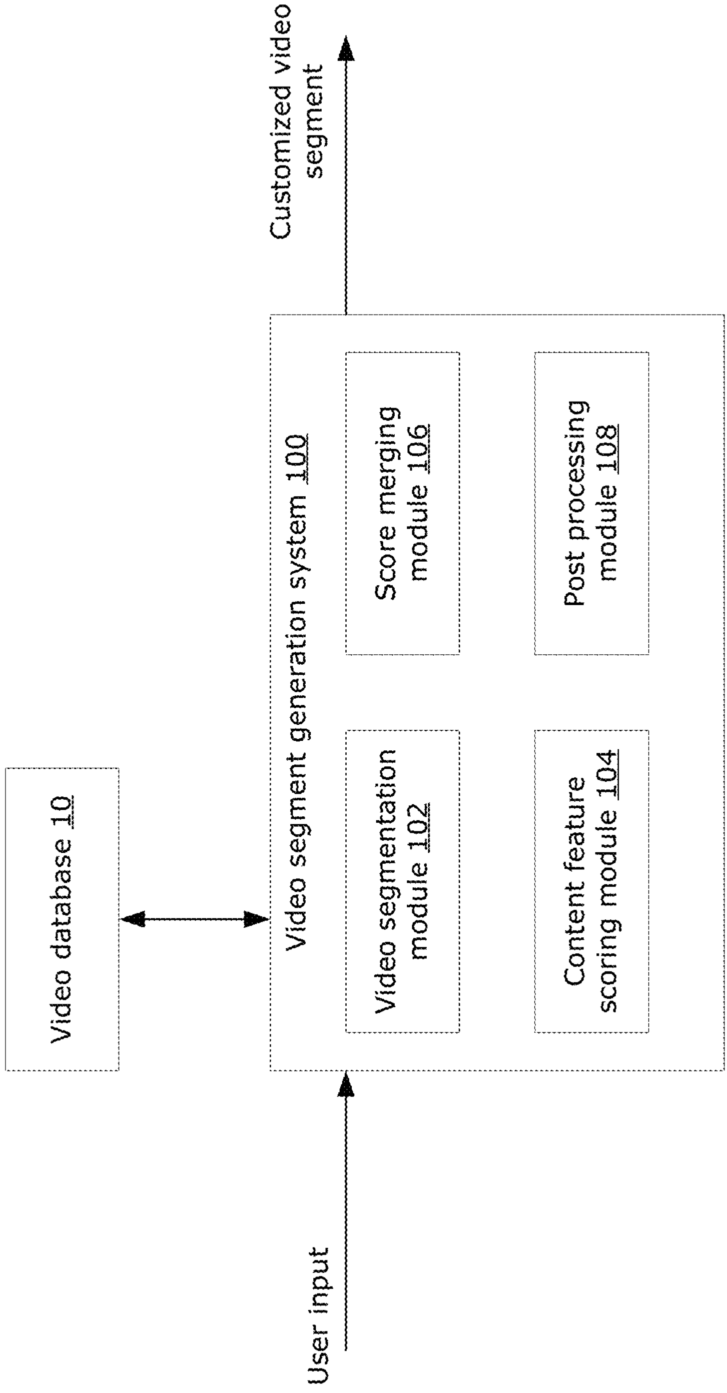
FIG. 1 is a block diagram illustrating an example video segment generation system, in accordance with examples of the present disclosure.

FIG. 1 is a block diagram illustrating an example video segment generation system 100, which may be implemented using devices and methods disclosed herein. The video segment generation system 100 may be implemented in a single physical machine or device (e.g., implemented as a single computing device, such as a single workstation, single server, etc.), or may be implemented using a plurality of physical machines or devices (e.g., implemented as a server cluster). For example, the video segment generation system 100 may be implemented as a virtual machine or a cloud-based service (e.g., implemented using a cloud computing platform providing a virtualized pool of computing resources), which may be accessible via a user device (e.g., smartphone, tablet, desktop device, workstation, etc.).

In some examples, the video segment generation system 100 may be in communication (e.g., over a wireless communication network) with a video database 10 storing retrievable videos. Videos stored in the video database 10 may or may not be logically partitioned into video segments. The video segment generation system 100 may communicate with the video database 10 to retrieve a video from which a customized video segment is generated. In some examples, a generated customized video segment may also be stored in the video database 10, in association with the original longer video. In other examples, the video segment generation system 100 may not be in direct communication with the video database 10. Instead, the video segment generation system 100 may receive a video, from which a customized video segment is to be generated, from another computing device, such as a user device. Other arrangements may also be possible within the scope of the present disclosure.

The video segment generation system 100 generates a customized video segment from a video (e.g., a longer video stored in the video database 10). A video typically is a sequence of two or more frames (where each frame is typically a 2D RGB image). A subset of frames from a longer video may be referred to as a video segment. Each video segment may be defined by a start frame and an end frame (with zero, one or more frames between the start and end frames) and/or by a start timestamp and an end timestamp, for example. A video may be partitioned into two or more video segment that may or may not overlap. In some examples, a video may be partitioned into video segments and the union of the video segments may not include all frames of the video. For example, a video may be partitioned into video segments that correspond to different scenes, where non-scene frames (e.g., credits) are not part of any video segment.

The video segment generation system 100 performs operations, as disclosed herein, that outputs a customized video segment (generated from a longer video), where the customized video segment is customized based on the content features of each video segment. The customized video segment may be provided as a looped video segment (e.g., as an animated GIF file), for example.

The video segment generation system 100 in this example includes subsystems including a video segmentation module 102, a content feature scoring module 104, a score merging module 106 and a post processing module 108. In some examples, one or more of the subsystems 102, 104, 106 and 108 may be optional. For example, if the videos stored in the video database 10 are already logically partitioned into video segments, the video segmentation module 102 may not be needed (or may be disabled). In another example, if post processing (e.g., looping or smoothing) of the generated video segment is not required, the post processing module 108 may not be needed (or may be disabled). One or more subsystems of the 102, 104, 106 and 108 may be implemented using a machine learning model. For example, the content feature scoring module 104 may be implemented using one or more machine learning models that are each pre-trained to extract certain content features from a video segment, as discussed further below.

In some examples, the video segment generation system 100 may receive (e.g., from a user device) user input, and may generate the customized video segment based on the user input. For example, the user input may be a selection of weight values, which may be used by the score merging module 106 to compute a weighted aggregate score. In another example, the user input may be a query (e.g., in the form of a video segment, audio data or text data), that the customized video segment may be customized to be similar to the content features of the query. Examples of how the video segment generation system 100 may make use of such user input are described further below.

Although FIG. 1 illustrates certain subsystems of the video segment generation system 100, it should be understood that this is not intended to be limiting and the video segment generation system 100 may include greater or fewer number of subsystems (and may not include any subsystem at all). Functions described as being performed by a particular subsystem may be performed by a different subsystem, and/or may be a function of the overall video segment generation system 100. Operation of the video segment generation system 100 will be discussed in greater detail further below.

Figure 2:
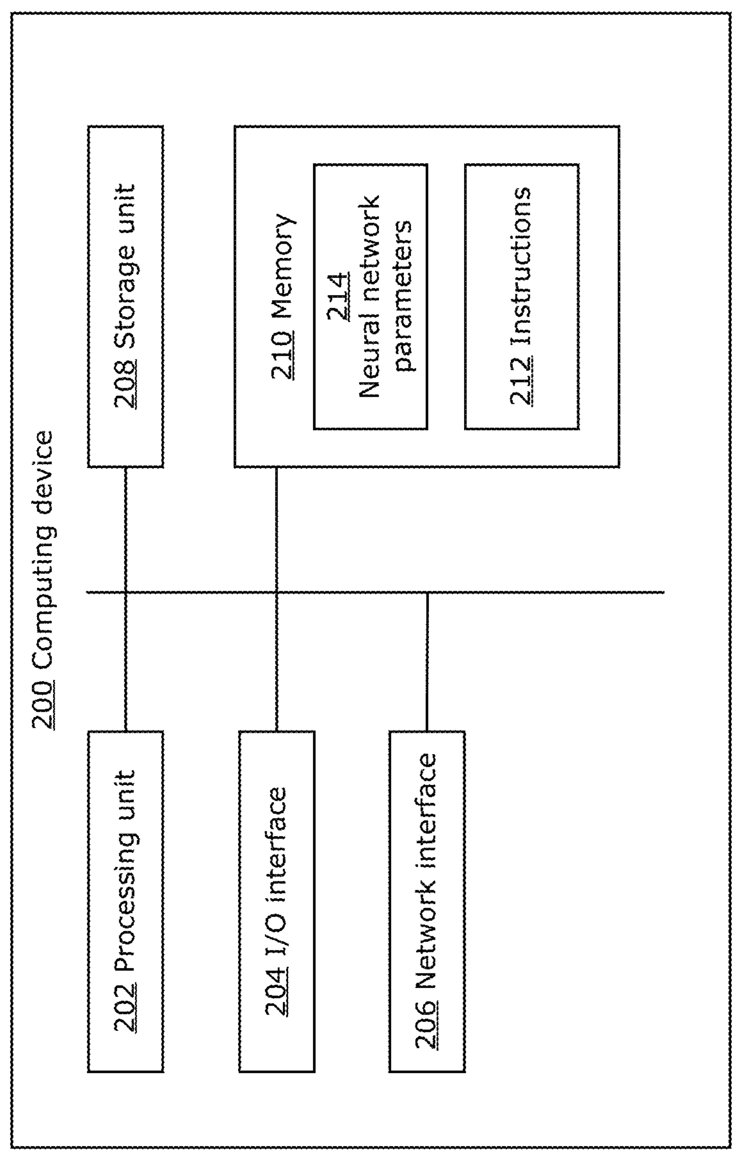
FIG. 2 is a block diagram illustrating an example computing device that may be used to implement examples of the present disclosure.

FIG. 2 is a block diagram illustrating a simplified example computing device 200 that may be used for implementing the video segment generation system 100, in some embodiments. The computing device 200 may represent a server, for example. As discussed previously, the video segment generation system 100 may be implemented in other hardware configurations, including implementation using a plurality of computing devices (e.g., a cloud-based computing platform accessing a virtual resource pool) or in an end user device (e.g., a smartphone, tablet, desktop device, workstation, etc.). Although FIG. 2 shows a single instance of each component, there may be multiple instances of each component in the computing device 200. The computing device 200 may be used to execute instructions for processing data using a trained machine learning based model (e.g., a neural network), as discussed further below.

In this example, the computing device 200 includes at least one processing unit 202, such as a processor, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof.

The computing device 200 may include an input/output (I/O) interface 204, which may enable interfacing with an input device and/or output device (not shown).

The computing device 200 may include a network interface 206 for wired or wireless communication with other computing devices (e.g., the video database 10, a user device providing user input, etc.). The network interface 206 may include wired links (e.g., Ethernet cable) and/or wireless links (e.g., one or more antennas) for intra-network and/or inter-network communications. The network interface 206 may also enable the computing device 200 to output a generated video segment to another computing device (e.g., to be stored in the video database 10, or as a response to a query from a user device).

The computing device 200 may include a storage unit 208, which may include a mass storage unit such as a solid state drive, a hard disk drive, a magnetic disk drive and/or an optical disk drive. In some examples, the video representation storage 140 may be implemented using the storage unit 208.

The computing device 200 may include a memory 210, which may include a volatile or non-volatile memory (e.g., a flash memory, a random access memory (RAM), and/or a read-only memory (ROM)). The non-transitory memory 210 may store instructions 212 for execution by the processing unit 202, such as to carry out example embodiments described in the present disclosure. For example, the memory 210 may store instructions 212 for implementing the video segment generation system 100 as well as any of the methods disclosed herein. The memory 210 may also store neural network parameters 214, which may be parameters of a trained neural network, as described further below. The memory 210 may include other software instructions, such as for implementing an operating system and other applications/functions.

The computing device 200 may additionally or alternatively execute instructions from an external memory (e.g., an external drive in wired or wireless communication with the server) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

Reference is again made to FIG. 1. Example operations of the video segment generation system 100 are now described.

In some examples, a video (e.g., from the video database 10, provided by a user device, stored locally at the video segment generation system 100, or received from some other computing device) is first processed by the video segmentation module 102 into multiple video segments. As previously mentioned, in some examples the video may already be partitioned into video segments and the video segmentation module 102 may not be used. In some examples, the video segmentation module 102 may be used to generate video segments regardless of whether the video has already been partitioned into video segments. For example, although a video may have already been partitioned into video segments, such video segments may be defined incorrectly (e.g., not corresponding to actual scene change in the video), or may be content-agnostic (e.g., partitioned into 10 minute long segments without consideration of content). In such cases, the video segmentation module 102 may be used to partition the video into video segments that are more suitable for content-based generation of a customized video segment.

The video segmentation module 102 may use any suitable algorithm for partitioning the video into multiple video segments. An example is described below, but this is not intended to be limiting.

For example, a video may be partitioned based on scene change. If there is a significant change in the image between a first frame and the next consecutive second frame, then the first frame may be defined as the end frame of a current video segment and the second frame may be defined as the start frame of a new video segment. A scene change may be determined based on change in pixel value between a first frame and the next consecutive second frame, for example as computed using the following equation:

$$\Delta = \sum_{i,j} (I_t(i, j) - I_{i-1}(i, j))$$

where Δ is a value representing the amount of change between a first frame at time t−1 and the next consecutive second frame at time t, where (i,j) is the location of each pixel in the frames, and where I is the pixel value for each pixel (e.g., intensity value, RGB value, etc.). A scene change (and hence a new video segment) may be determined if the amount of change is greater than a predefined scene change threshold value.

In some examples, the video segmentation module 102 may implement more complex algorithms and/or implement trained machine learning-based models to perform the video segmentation.

In some examples, the video segmentation module 102 may partition the video into video segments based on any other suitable criteria. For example, the video may be partitioned into video segments based on any pause or decrease in motion between frames, based on a change in music in an audio file associated with the video, etc. In some examples, the video segmentation module 102 may partition the video into overlapping video segments using a moving window (e.g., a window of 20 frames that moves by a step of 2 frames at a time), among other possibilities.

Each video segment (e.g., partitioned from the video by the video segmentation module 102) is processed by the content feature scoring module 104, which generates (e.g., using one or more trained feature extraction model, which may be any suitable machine learning-based model) a set of scores for each video segment. In some examples, the input to the content feature scoring module 104 may be the entire original video (instead of the video segments partitioned from the video) together with information defining the video segments (e.g., indexes of start and end frames of each video segment; or indexes of start and end timestamps of each video segment). In some examples, the input to the content feature scoring module 104 may be both the entire original video as well as the partitioned video segments. Having access to the entire original video may enable the content feature scoring module 104 to generate content feature scores that take into account the overall context of the video and that may be more accurate to the overall semantic meaning of the video.

Figure 3:
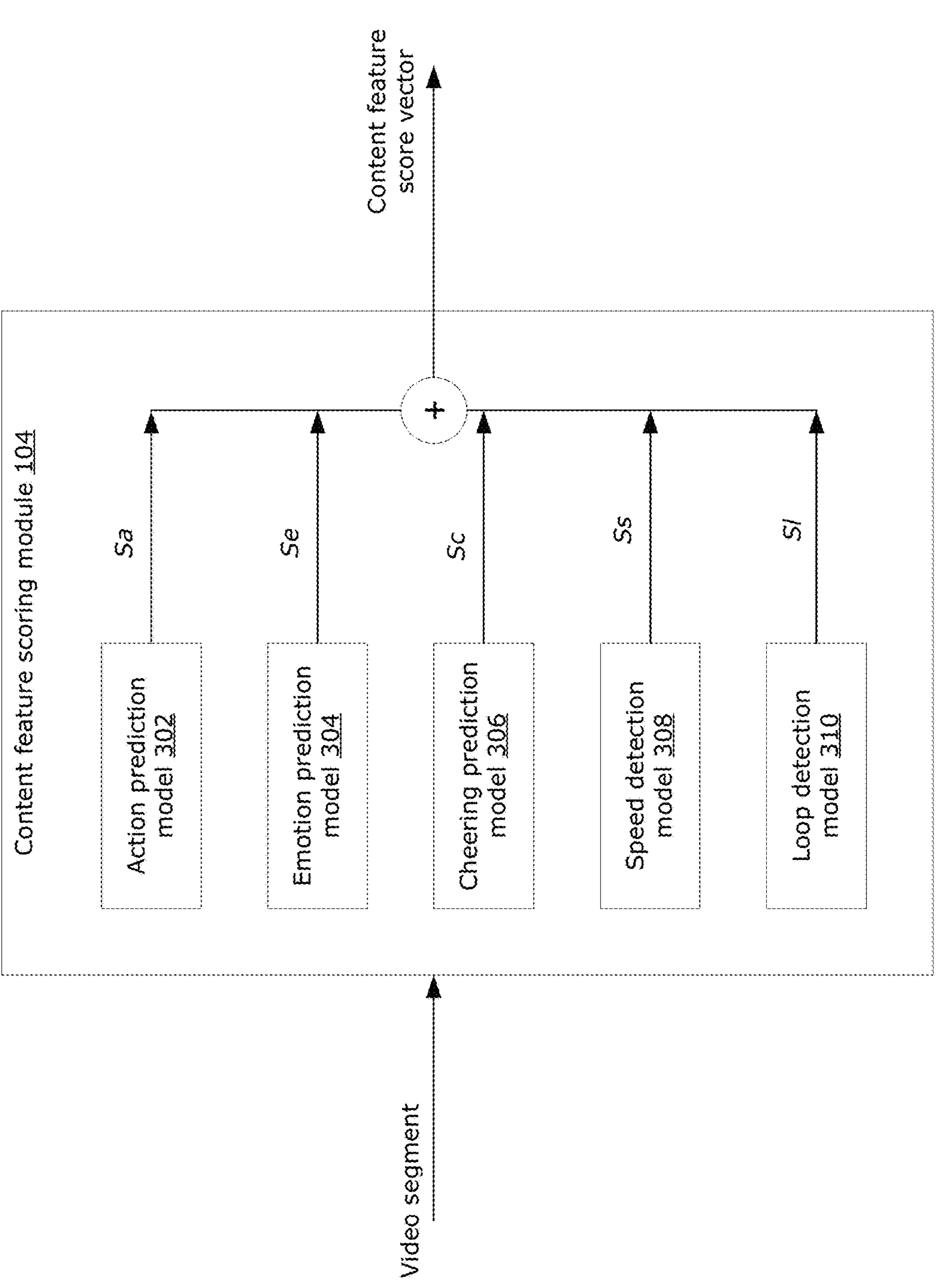
FIG. 3 is a block diagram illustrating an example implementation of a content feature scoring module, in accordance with examples of the present disclosure.

FIG. 3 is a block diagram illustrating an example implementation of the content feature scoring module 104. In the example shown, the content feature scoring module 104 receives as input one video segment and outputs a set of scores (e.g., in the form of a content feature score vector) representing the content features of the video segment. In other examples, the content feature scoring module 104 may receive as input multiple video segments, or may receive the entire original video together with information defining the video segments, and may output multiple sets of scores (e.g., in the form of a content feature score matrix, where each row of the matrix corresponds to a respective video segment) representing the content features of each respective video segment. For simplicity, the following discussion will refer to the example where the content feature scoring module 104 processes a video segment to output a set of scores, however this is not intended to be limiting.

In this example, the content feature scoring module 104 is implemented using a plurality of trained machine learning-based models 302 to 310, where each model is trained to extract a particular content feature of interest. It should be understood that there may be greater or fewer number of models implemented by the content feature scoring module 104, different models may be use to extract different content features of interest, and non-machine learning-based algorithms may also be used. In some examples, the content feature scoring module 104 may be implemented using a single trained machine learning-based model that generates the content feature scores for all content features of interest (rather than using different models for different content features).

The models that are implemented by the content feature scoring module 104 may be models that extract content features related to an exciting moment in the video. In the example shown, the content feature scoring module 104 includes a trained action prediction model 302, an emotion prediction model 304, a cheering prediction model 306, a speed detection model 308 and a loop detection model 310. The content feature extracted by each model may be a numerical output (e.g., vector or scalar) that is a representation of the extent to which the particular content is present in the video segment. The action prediction model 302 may generate a numerical score (e.g., action score, denoted Sa) representing the amount of action content (e.g., dynamic human actions) in the video segment. The emotion prediction model 304 may generate a numerical score (e.g., emotion score, denoted Se) representing the amount of emotion content (e.g., intense emotions such as anger, fear, joy, etc.) in the video segment. The cheering prediction model 306 may generate a numerical score (e.g., cheering score, denoted Sc) representing the amount of cheering (e.g., clapping, waving, jumping, etc.) in the video segment. The speed detection model 308 may generate a numerical score (e.g., speed score, denoted Ss) representing the amount of speed content (e.g., speed of moving scenery, speed of objects in the scene, etc.) in the video segment. The loop detection model 310 may generate a numerical score (e.g., loop score, denoted Sl) representing the amount of looping or repeated content (e.g., important moments may be shown repeatedly) in the video segment. The models 302, 304, 306, 308, 310 may each be any suitable machine learning-based model (or in some cases non-machine learning-based models) that has been developed for the particular task. Some examples that may be used for implementing the models 302, 304, 306, 308, 310 are now described, however these examples are not intended to be limiting. Lin et al. ("TSM: Temporal Shift Module for Efficient Video Understanding", arXiv:1811.08383v3, 2019) describes an example that may be used for the action prediction model 302. Mellouk et al. ("Facial emotion recognition using deep learning: review and insights", *Procedia Computer Science* 175:689-694, 2020) describes examples that may be used for the emotion prediction model 304. Franzoni et al. ("Emotional sounds of crowds: spectrogram-based analysis using deep learning", *Multimedia Tools and Applications* 79:36063-36075, 2020) describes an example that may be used for the cheering prediction model 306. Benaim et al. ("SpeedNed: Learning the Speediness in Videos", arXiv:2004.006130v2, 20020) describes an example that may be used for the speed detection model 308. The loop detection model 310 may be implemented using various non-machine learning-based algorithms that detects whether there is a substantial amount of duplicated frames in a video segment. Each of the scores generated by the different models 302 to 310 may be combined (e.g., concatenated) to output a set of scores (e.g., in the format of a content feature score vector) for the video segment.

The set of scores for a given video segment represents the extent certain content features are present in the given video segment (e.g., a higher score for a certain content feature indicates that content feature is found in more frames within the video segment). Thus, by considering all the sets of scores generated for all the video segments partitioned from a video, it is possible to identify (based on the score values) which single video segment exhibits a particular content feature most strongly. Further, as discussed below, the scores may be merged (e.g., using weighted aggregation) to identify which video segment most exhibits a certain combination of content features.

In some examples, the sets of scores each representing the content features of a respective video segment of a video may be stored with the video in the video database 10 (e.g., may be stored as metadata with the video). This may enable the sets of scores to be retrieved at some later time and used repeatedly to generate different customized video segments for the video, without having to re-process the video using the video segmentation module 102 and the content feature scoring module 104. In the following discussion, it may be assumed that the sets of scores generated by the content feature scoring module 104 are subsequently processed by the score merging module 106. However, it is also possible that the sets of scores generated by the content feature scoring module 104 are stored (e.g., in the video database 10) and later retrieved to be processed by the score merging module 106.

The sets of scores generated for the video segments are processed by the score merging module 106. The score merging module 106 combines (or merges) the set of scores for each video segment in a customizable way. For example, the score merging module 106 may compute a weighted aggregate score from a set of scores for a given video segment, by applying a set of weight values to the set of scores. The same set of weight values is used to compute a weighted aggregate score for each video segment. The set of weight values adjusts (or "tunes") the relative importance of each content feature by applying a larger magnitude weight to a more important content feature and a smaller magnitude weight to a less important content feature. The weighted sum is then the weighted aggregate score. A higher weighted aggregate score indicates that the corresponding video segment has more of the desired content features (as represented by the set of weight values).

Notably, the score merging module 106 enables the weighted aggregate score to be recomputed if the set of weight values changes, without requiring re-computing the content feature scores. This means that the relative importance of each content feature can be adjusted dynamically, for example in response to user input, without requiring re-computing the content feature scores. This avoids having to repeatedly process the same video segment through different machine learning-based models (which is computationally expensive and time-consuming) whenever the user wishes to generate a customized video segment to emphasize a different content feature. For example, the user may first wish to generate a customized video segment with a large amount of cheering (e.g., by selecting a first set of weight values), then at some later time change their mind and instead wish to generate a customized video segment with a lot of fast action (e.g., by selecting a different second set of weight values). In another example, a customized video segment may be generated based on a default set of weight values (e.g., predefined at the video segment generation system 100), and the user may instead choose a different set of weight values to generate a different customized video segment. Such customization may be possible via user input that adjusts the weight values applied to the sets of scores.

In some examples, the score merging module 106 may also enable the video segments to be matched with a query (e.g., provided via user input). A query may, for example, be in the form of a video query (e.g., a short video clip comprising several frames), audio query (e.g., audio data comprising a short audio clip), text query (e.g., text data comprising a word, phrase or short sentence), or image query (e.g., 2D image data). The score merging module 106 may implement a trained feature extraction model to extract query features from the query (e.g., in the form of a query feature vector) and similarly extract query features from the video segments (e.g., in the form of video segment feature vectors). The trained feature extraction model may be a machine learning-based model that has been trained to generate the query feature vector and the video segment feature vector to be in the same vector space (e.g., a multi-dimensional space defined by all possible feature vectors that can be extracted), to enable direct comparison between the query feature vector and the video segment feature vector. Different trained feature extraction models may be used depending on the format of the query. For example, if the query is in the form of a video query, a first trained feature extraction model may be used that has been trained to generate a query feature vector from video data; whereas if the query is in the form of a text query, a different second trained feature extraction model may be used that has been trained to generate a query feature vector from text data. The feature extraction models that are used to generate the query feature vector and the video segment feature vector may each be any suitable machine learning-based model. Some non-limiting examples are now described. For example, a convolutional neural network may be used as a feature extraction model for generating a query feature vector from a video query as well as for generating a video segment feature vector. For example, EfficientNet (e.g., as described by Tan et al. "EfficientNet: Rethinking Model Scaling for Convolutional Neural Networks", arXiv: 1905.11946v5, 2020) may be used to extract features from the frames of a video query (or video segment), and the extracted features may be averaged or otherwise aggregated to generate the query feature vector (or video segment feature vector). In another example, if the query is an audio query, a convolutional neural network (e.g., as described by Hershey et al. "CNN Architectures for Large-Scale Audio Classification", arXiv:1609.09430v2, 2017) may be trained to generate an audio embedding from the audio data, and the audio embedding may be used as the query feature vector. In another example, if the query is a text query, a language model such as BERT (e.g., as described by Devlin et al. "BERT: Pre-training of Deep Bidirectional Transformers for Language Understanding", arXiv:1810.04805v2, 2019) may be used to generate a text embedding from the text data, and the text embedding may be used as the query feature vector. Thus, the score merging module 106 may implement different trained feature extraction models depending on the query. In some examples, the score merging module 106, instead of implementing the trained feature extraction models itself, may instead use external feature extraction models (e.g., external to the video segment generation system 100, for example another cloud-based service) to generate the query feature vector and/or the video segment feature vector.

A similarity score may be computed (e.g., by computing a vector correlation) between the query feature vector and the video segment feature vector of each of the video segments having the highest weighted aggregate scores (e.g., top five or top ten weighted aggregate scores). A video segment that has a high similarity score is considered to be a good match to the query (e.g., having similar content features to the query). The similarity score may be incorporated (e.g., summed, or multiplied) into the weighted aggregate score, or may be a separate score (e.g., the similarity score may be a secondary score that is considered after the weighted aggregate score; or the similarly score may be a primary score that is prioritized over the weighted aggregate score).

The score merging module 106 may rank the video segments in decreasing order of weighted aggregate score (and optionally similarity score), and a high-ranked video segment (e.g., the highest-ranked video segment having the highest ranked weighted aggregate score) may be selected as the customized video segment to be outputted.

In some examples, prior to outputting the customized video segment, the post processing module 108 may perform post processing operations. The post processing operations may enable the customized video segment to be useable as a looping animation (e.g., an animated GIF file, or short video clip).

For example, to enable the customized video segment to be played on loop, without an abrupt frame jump when a new loop starts (i.e., after playing the last frame and looping back to the first frame), the post processing module 108 may perform operations to ensure that the frames at the start and end of the customized video segment are similar (e.g., on a pixel level). A frame difference may be computed between one or more frames at the start of the customized video segment and one or more frames at the end of the customized video segment. In some examples, the frame difference may be computed between a single start frame (i.e., the first frame) and a single end frame (i.e., the last frame) of the customized video segment. For example, a pixel-to-pixel frame difference may be computed between the start and end frames of the customized video segment using the following computation:

$$\Delta = \sum_{i,j} (I_{end}(i, j) - I_{start}(i, j))$$

where Δ is the frame difference value representing the amount of change between the end frame (denoted by subscript end) and the start frame (denoted by subscript start), where (i,j) is the location of each pixel in the frames, and where I is the pixel value for each pixel (e.g., intensity value, RGB value, etc.).

In another example, the frame difference may be computed between a defined number of frames (e.g., five frames) at the start of the customized video segment (which may be referred to as a start clip) and a defined number of frames (e.g., five frames) at the end of the customized video segment (which may be referred to as an end clip). For example, a frame difference may be computed between the start and end clips using the following computation:

$$\Delta = \sum_{i,j} I_{st_{clip}}(i, j) - \sum_{i,j} i_{ed_{clip}}(i, j)$$

where Δ is the frame difference computed between the start and end clips, where (i,j) is the location of each pixel in the frames of each clip, and where I is the pixel value for each pixel (e.g., intensity value, RGB value, etc.). In this calculation, the pixel intensity in each clip is first summed up, and the frame difference is computed between the two summed pixel intensities. In some examples, each summation may be averaged by the number of frames in the respective clip and the frame difference may be computed between the two averaged pixel intensities (e.g., to accommodate the possibility of having different number of frames in the start clip and the end clip).

Regardless of how the frame difference is computed, the computed difference may be compared against a defined difference threshold (which may be stricter than the threshold used to identify a scene change during video segmentation operations). If the computed difference is within the threshold, then the customized video segment may be considered to be sufficiently similar between the start and end frames to enable a smooth loop. If the computed difference exceeds the threshold, then the customized video segment may be further processed by the post processing module 108. For example, the post processing module 108 may shorten the customized video segment by discarding the end frame and using the frame previous to the end frame (i.e., the penultimate frame) as the new end frame, recomputing the frame difference, and repeating this process until the difference threshold is no longer exceeded. In some examples, instead of discarding the end frame, a similar process may be performed with respect to the start frame. That is, the process may involve discarding the start frame and using the frame following the start frame (i.e., the second frame) as the new start frame, recomputing the frame difference and repeating the process until the frame difference falls within the difference threshold. In another example, the post processing module 108 may reject the customized video segment and select a different video segment (e.g., the video segment having the second highest weighted aggregate score) as the new customized video segment. The frame difference may then be computed for the new customized video segment, and the process repeated until there is a customized video segment which has a frame difference that is within the difference threshold. In general, the post processing module 108 may perform operations to ensure similarity between the start and end frames of the customized video segment.

The post processing module 108 may additionally or alternatively perform operations to zoom in to a region of interest (ROI) in the customized video segment. For example, the post processing module 108 may implement a trained face detection model, or other object detection model (e.g., vehicle detection model, human detection model, etc.) to detect a likely ROI within the customized video segment and crop the frame(s) to zoom in on the ROI. For example, an object detection model may be used to detect, as the ROI, an object of interest such as a human face or human body and to determine the bounding box of the object of interest. For example, a suitable object detection model may be YOLOv3 (e.g., as described by Redmon et al. "YOLOv3: An Incremental Improvement", arXiv1804.02767v1, 2018). Sampled frames (e.g., sampled at regular intervals) of the customized video segment may be processed using the object detection model, to detect an object of interest and generate the bounding box of that object in the sampled frames. The location of the bounding box may be estimated (e.g., using any suitable video tracking algorithm) for any frames that were not processed by the object detection model. The bounding box may be used to define the ROI for the customized video segment. The post processing module 108 may then zoom in on this detected ROI, prior to outputting the customized video segment.

In another example, if the customized video segment is to be played on loop, the post processing module 108 may additionally or alternatively perform operations to vary the length (i.e., the number of frames) in each loop of the customized video segment. For example, the post processing module 108 may define several frames at the end of the customized video segment (e.g., the last five frames) to be variable end frames and/or may define several frames at the start of the customized video segment (e.g., the first five frames) to be variable start frames. In some examples, the variable length of the customized video segment may be variable within a range that may be defined by user input. For example, the user may provide input to enable or disable the variable length, and may also provide input indicating the number of frames (or length of time) that may be defined as variable start or end frames at the start and/or end of the customized video segment The post processing module 108 may include metadata with the customized video segment so that, when played on loop, each loop of the customized video segment may start with any one of the variable start frames and/or end on any one of the variable end frames (e.g., based on random selection).

Figure 4:
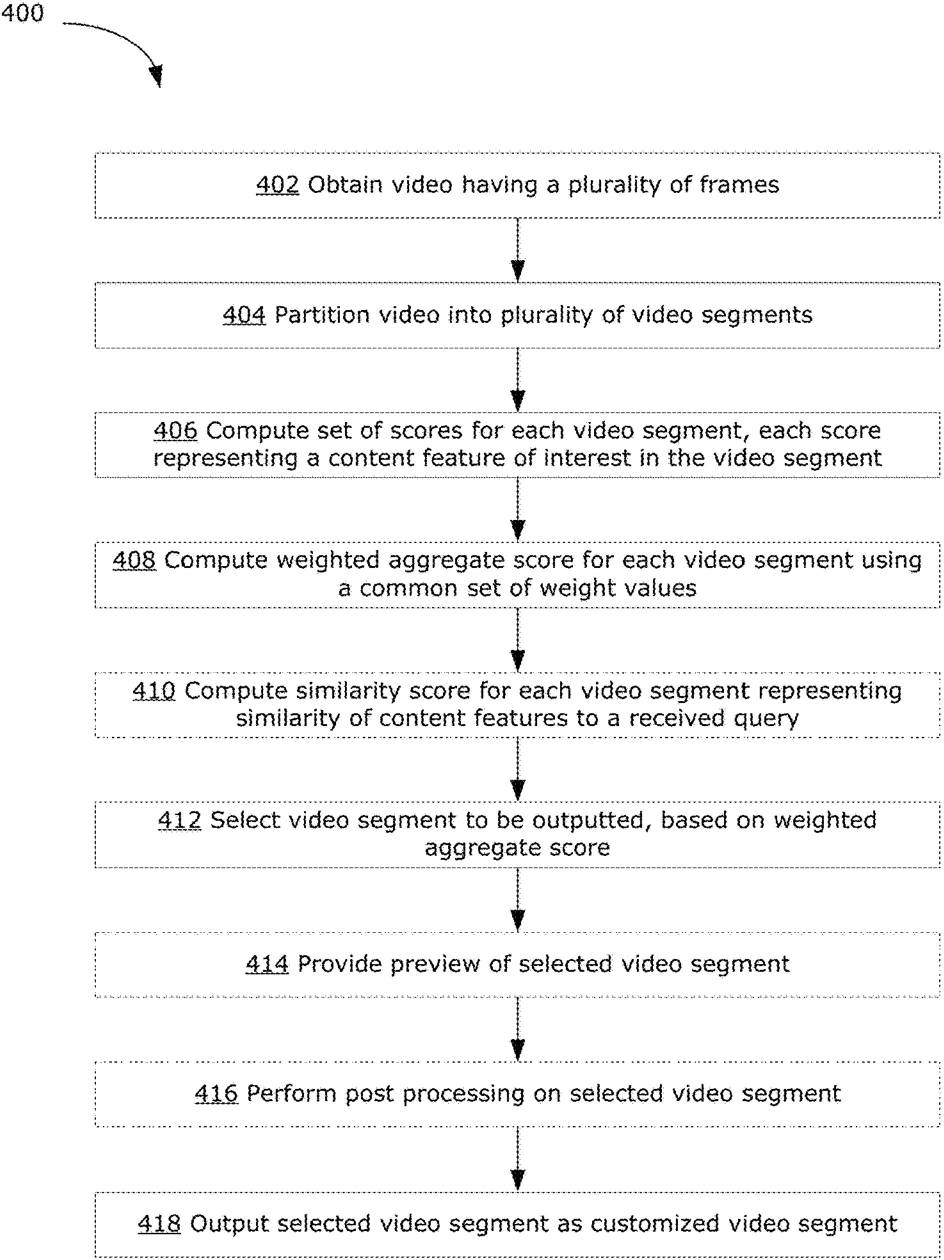
FIG. 4 is a flowchart illustrating an example method for generating a customized video segment, in accordance with examples of the present disclosure.

Reference is now made to FIG. 4, which is a flowchart illustrating an example method 400, which may be performed by the video segment generation system 100. For example, the computing device 200 may execute instructions stored in memory or in a non-transitory computer-readable medium to implement the method 400 using various subsystems of the video segment generation system 100.

At 402, a video (which has a plurality of frames) is obtained. The video may be obtained by retrieving the video from the video database 10, or by being received from a user device, among other possibilities.

At 404, the video is partitioned into a plurality of video segments (e.g., using the video segmentation module 102 as described above). In some examples, if video segments have already been defined for the video, step 404 may be omitted. In other examples, even if the video already has video segments defined, step 404 may still be performed, which may result in video segments different from those previously defined for the video.

At 406, a set of scores is computed for each video segment (e.g., using the content feature scoring module 104). For a given set of scores corresponding to a given video segment, each score in the given set of score represents a respective content feature in the given video segment. In particular, the magnitude of each numerical score may represent the extent to which the respective content feature is present in the given video segment. As discussed previously, the set of scores may include an action score, an emotion score, a cheering score, a speed score and/or a loop score, among other possibilities. Each score may be computing using a respective trained machine learning model that has been trained to extract and quantify the respective content feature from a video segment. After performing step 406, a set of scores has been computed for each video segment.

At 408, a weighted aggregate score (e.g., a weighted sum) is computed for each video segment using the respective set of scores computed for each video segment (e.g., using the score merging module 106). A common set of weight values is used to compute the weighted aggregate scores. As discussed above, user input may be received to adjust the set of weight values. The user input may involve adjusting the value of a specific weight, or may involve replacing one defined set of weight values (e.g., a set of weight values that places greater importance on a first content feature such as speed) with a different defined set of weight values (e.g., a set of weight values that places greater importance on a different second content feature such as motion). In some examples, if user input is not used to adjust the set of weight values (or in absence of any user input), a default set of weight values may be used.

Optionally, at 410, if a query is received (e.g., user input is a query, which may be a video query, audio query, text query or image query), a similarity score may be computed for each video segment. The similarity score for a given video segment represents the similarity of the content features of the video segment to the content features of the query. For example, as described above, a feature extraction model may be trained, depending on the format of the query (e.g., video data, text data or 2D image data), to extract a query feature vector from the query and also to extract a video segment feature vector from a given video segment. The feature extraction model should be trained such that the query feature vector and the video segment feature vector are in the same vector space, to enable a similarity comparison between the query feature vector and the video segment feature vector. The similarity score may be a numerical representation of the similarity between the query feature vector and the video segment feature vector in the same vector space. After performing step 410, a similarity score has been computed for each video segment.

At 412, a video segment, from among all video segments partitioned from the original video, is selected, based on the weighted aggregate score (computed at step 408). In some examples, if a similarity score was also computed at 410, the similarity score may be incorporated (e.g., added or multiplied) into the weighted aggregate score. In other examples if a similarity score was computed, a video segment is selected by first considering the weighted aggregate score (e.g., ranking all video segments in decreasing order of weighted aggregate score), then selecting, from among high-ranked (e.g., highest five- or highest ten-ranked) video segments, the video segment having the highest similarity score. In another example, the similarity score may be considered first (e.g., ranking all video segments in decreasing order of similarity score), then selecting, from among high-ranked (e.g., highest five- or highest ten-ranked) video segments, the video segment having the highest weighted aggregate score. After performing step 412, a video segment has been selected, where the selected video segment is considered to best match the desired content (as indicated by the set of weight values) and optionally best match the query (if step 410 is performed).

Optionally, at 414, a preview of the selected video segment may be provided (e.g., via a user interface, described below). The preview may be viewed by the user via a user device, and may enable the user to determine whether the selected video segment satisfies the desired content. If the user is not satisfied with the preview of the selected video segment, the user may provide new user input (e.g., to adjust the set of weight values and/or to provide a query), and the method 400 may return to step 408 and/or 410, in response to the new user input. If the user is satisfied with the preview of the selected video segment, the user may provide user input indicating the selected video segment is acceptable.

Optionally, at 416, prior to outputting the selected video segment, post processing may be performed on the selected video segment (e.g., using the post processing module 108). Post processing of the selected video segment may include, for example, operations to ensure smooth looping of the selected video segment, operations to enable variable length of each loop, operations to zoom in on a ROI within the selected video segment, etc.

At 418, the selected video segment (which may optionally have been post processed) is outputted as the customized video segment. For example, the customized video segment may be outputted as a short video clip (e.g., a preview of the original video) or looping animation (e.g., animated GIF) that is viewable on the user device. In some examples, the customized video segment may be simply viewed (e.g., streamed) on the user device, without the customized video segment being stored in long-term memory of the user device. In other examples, the customized video segment may be outputted to be stored in long-term memory of the user device.

Figure 5A:
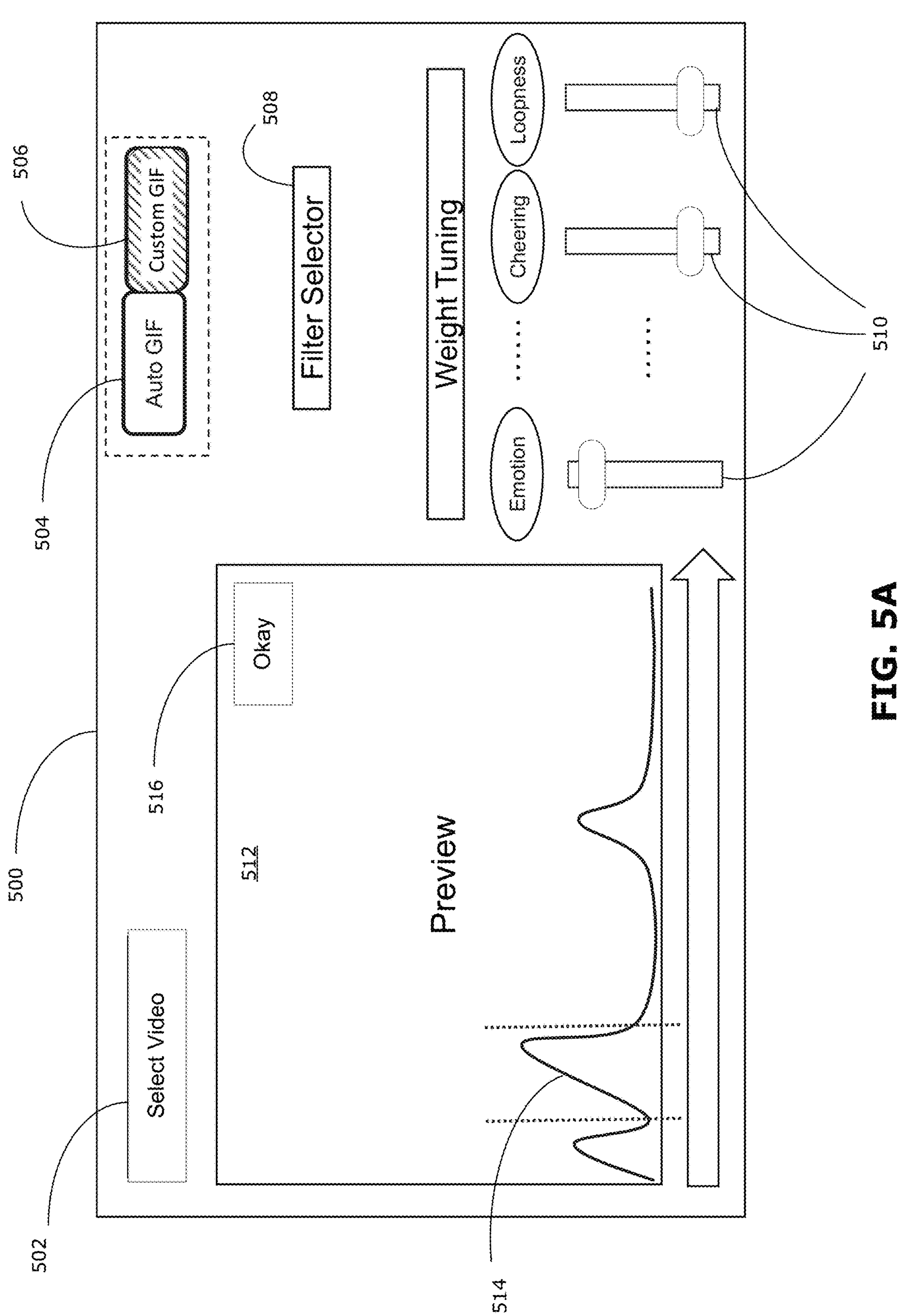
FIGS. 5A and 5B illustrate an example user interface, which may be provided in accordance with examples of the present disclosure.
Figure 5B:
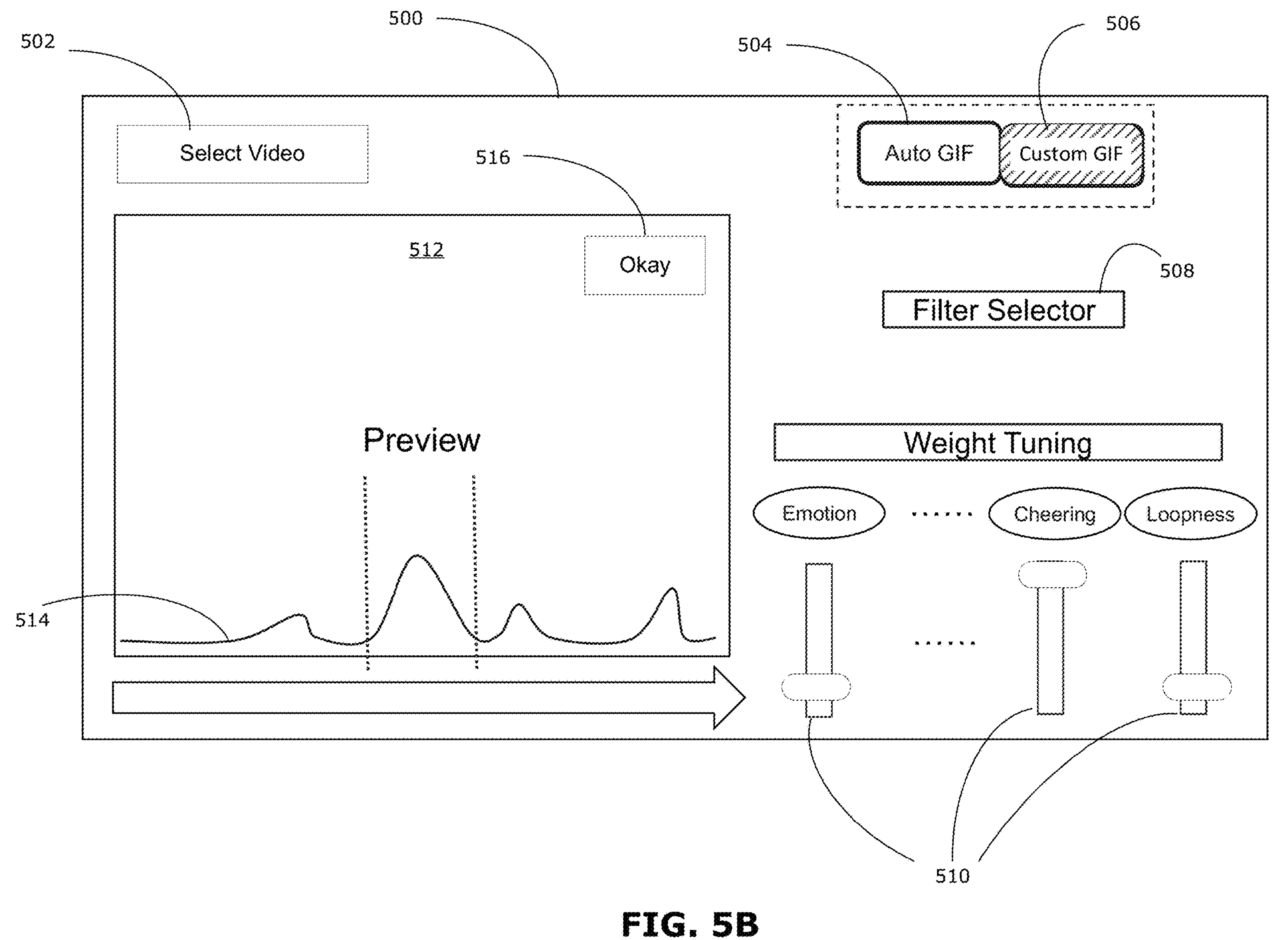

FIGS. 5A and 5B illustrate an example user interface 500 that may be provided to the user, to enable the user to provide user input for adjusting the weight values (e.g., at step 408). Additionally, the user interface 500 may enable the user to provide user input in the form of a query (e.g., video query, audio query, text query or image query). The user interface 500 may be displayed on a user device, for example, as a means for the user to provide user input via the user device to the video segment generation system 100.

The user interface 500 may include a select video option 502, which may be selected by the user to select a video from which the customized video segment is generated. For example, the select video option 502, when selected, may enable the user to upload a video from a user device, to select a video from the video database 10, etc.

The user interface 500 may include an auto GIF option 504, which may be selected by the user to use a default set of weight values for generating the customized video segment. The customized video segment in this example may be outputted in the format of an animated GIF. The user interface 500 may also include a custom GIF option 506, which may be selected by the user to enable the user to provide user input for adjusting the set of weight values. In this example, custom GIF option 506 has been selected (as indicated by shading). Selection of the custom GIF option 506 may enable a filter selector option 508 and weight tuning options 510 of the user interface 500 (the options 508 and 510 may be disabled or not displayed if the auto GIF option 504 is selected instead).

Selection of the filter selector option 508 may cause the user interface 500 to display a dropdown menu or popup menu (not shown) from which the user may select one or more content features that more desirable in the customized video segment and/or select one or more content features that are less desirable in the customized video segment. In some examples, selection of the filter selector option 508 may cause the user interface 500 to display a dropdown menu or popup menu (not shown) from which the user may select from among a plurality of defined sets of weight values. The defined sets of weight values may be predefined combinations of weight values that have been designed to achieve different content goals. For example, there may be first set of weight values that is designed to focus on exciting sports moments (e.g., with higher weight values for action, speed and cheering content features), and a different second set of weight values that is designed to focus on intense emotional moments (e.g., with higher weight values for emotion content features). In some examples, selection of the filter selection option 508 may cause the user interface 500 to display a popup menu (not shown) that enables the user to input a query (e.g., in the form of an upload of a video clip, text data or 2D image data).

The weight tuning options 510 in this example are provided in the user interface 500 as sliders that the user may interact with to adjust the relative weight values for each content feature (in this example, emotion, cheering and loopness content features, although this is not intended to be limiting).

It should be understood that the inputs mechanisms described above and shown in FIG. 5A are illustrative and are not intended to be limiting. Other input mechanisms (e.g., buttons, input field, etc.) may also be used.

The user interface 500 may include a preview area 512 in which a preview of the selected video segment (based on the set of weight values and/or query input) may be displayed. Overlaid on the preview area 512 may be a graph 514 that represents the weighted aggregate score that has been computed for different video segments of the entire video. The portion of the graph 514 corresponding to the selected video segment may be indicated (by the use of dashed lines in FIG. 5A, or by other means such as highlighting), to enable the user to better understand why the selected video segment has been selected.

For example, FIG. 5B illustrates the user interface 500 after user input has been received that changes the relative weight values for the content features. Compared to FIG. 5A, FIG. 5B shows that the weight value for emotion content feature has been lowered, the weight value for cheering content feature has been raised, and the weight value for loopness content feature is unchanged. As a result of the changed weight values, the weighted aggregate scores for the video segments are recomputed. The graph 514 in FIG. 5B illustrates that the weighted aggregate scores for the video segments have changed (relative to the graph 514 in FIG. 5A), and a different video segment is now selected (as indicated by the use of dashed lines in FIG. 5B). The different selected video segment may be displayed in the preview area 512.

An okay option 516 may be provided, which the user may select to indicate that the selected video segment is acceptable to be outputted as the customized video segment. Selection of the okay option 516 may result in generation of an animated GIF file, for example, that shows the frames of the customized video segment.

The user interface 500 may include other options, such as selectable options for enabling or disabling different post processing operations (e.g., option for smooth looping, option for variable loop length, option for zooming to ROI, etc., which may be performed by the post processing module 108). The user interface 500 may also include options for selecting a desired file format for outputting the customized video segment, for selecting a desired length (e.g., in number of seconds, number of minutes or number of frames) of the customized video segment, etc. Other options may be included in the user interface 500.

In various examples, the present disclosure describes methods and devices that enable generation of a customized video segment, which may be customizable based on user input. The customized video segment may, for example be outputted as in a file format that can be used for looping animations (e.g., animated GIF file) and/or for video previews. The customized video segment may be one to several seconds in length, or up to several minutes in length, for example.

Examples of the present disclosure may enable generation of a customized video segment that captures a moment of interest (e.g., an exciting moment, or an intensely emotional moment) within a longer video, without requiring a user to manually search through the and select start and end frames for the specific moment. The customized video segment may be generated in a way that avoids sharp scene or shot changes (e.g., by performing video segmentation that avoids such sharp changes) and/or that enables smooth looping (e.g., by performing operations to ensure the start and end frames of the video segment are sufficiently similar). The customized video segment may also be generated to be more dynamic, for example enabling variable length for each loop of the video segment and/or enabling zooming in to a ROI within the video segment.

The present disclosure enables a user to provide input (e.g., by adjusting the weight values for computing the weighted aggregate score, or by providing query input) that causes reranking of the video segments (e.g., based on a recomputed content scores and/or based on similarity scores), so that different customized video segments may be generated in response to different user inputs.

An example user interface is also disclosed, which enables a user to better understand how the customized video segment is generated, and to guide the user to provide user inputs.

In some examples, user input in response to a preview of a selected video segment (e.g., user input that changes the weight values in order to better match the user's desired content) may be collected as feedback information, that may be used for retraining of machine learning models (such as the machine learning models that are implemented by the content feature scoring module 104). As such, examples of the present disclosure may follow MLOps principles, where MLOps generally refers to a set of industry-wide practices that aims to continuously test and improve the reliability and performance of machine learning models.

Examples of the present disclosure may be implemented as a modularized system (e.g., as a cloud-based service, or as an application executed on a user device), which may interface with any existing or future video editing software.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for generating a customized video segment from a video, the method comprising:

computing, for each respective video segment of one or more video segments of the video, each video segment having two or more frames, a respective set of scores, each score representing a respective content feature in the respective video segment;

receiving, from a user device, user input including a selection of one or more user-selected weight values to be applied to each respective set of scores;

computing a respective weighted aggregate score for each respective video segment by applying, to each respective set of scores, a common set of weight values including the user-selected one or more weight values;

selecting a selected video segment as the customized video segment, the selected video segment being selected from one or more high-ranked video segments having high-ranked weighted aggregate scores;

receiving, from the user device, a changed user input that causes the common set of weight values to change to a changed common set of weight values;

recomputing the respective weighted aggregate score for each respective video segment using the changed common set of weight values;

selecting an updated selected video segment as the customized video segment, based on the updated selected video segment being one of one or more reranked video segments having high-ranked recomputed weighted aggregate scores; and outputting the updated selected video segment as the customized video segment.

2. The method of claim 1, wherein the updated selected video segment has a highest ranked recomputed weighted aggregate score.

3. The method of claim 1, further comprising:

receiving, from the user device, further user input including a user-submitted query;

comparing a query feature vector representing features of the user-submitted query with a respective video segment feature vector representing features of each respective reranked video segment; and selecting the reranked video segment represented by the video segment feature vector having a highest similarity with the query feature vector as the updated selected video segment.

4. The method of claim 1, further comprising:

prior to receiving the changed user input, providing output to the user device to cause the user device to provide a preview of the selected video segment together with a visual indication of the weighted aggregate score for the selected video segment.

5. The method of claim 4, further comprising:

after selecting the updated selected video segment, updating the preview based on the updated selected video segment and updating the visual indication based on the recomputed weighted aggregate score.

6. The method of claim 1, wherein outputting the updated selected video segment comprises:

computing a respective frame difference between a start and an end frame of each respective reranked video segment; and selecting the updated selected video segment to be a reranked video segment having a respective frame difference that falls within a defined difference threshold.

7. The method of claim 1, wherein outputting the updated selected video segment comprises:

computing a frame difference between a start and an end frame of the updated selected video segment;

in response to the frame difference exceeding a defined difference threshold, defining a frame previous to the end frame as a new end frame or defining a frame following the start frame as a new start frame; and repeating the computing and the defining until the frame difference falls within the defined difference threshold.

8. The method of claim 1, wherein computing the respective set of scores for each respective video segment comprises, for a given video segment:

generating each respective score in the set of scores by processing the given video segment using a respective trained content feature extraction model.

9. The method of claim 8, wherein the respective trained content feature extraction model includes at least one of:

a trained action prediction model;

a trained emotion prediction model;

a trained cheering prediction model;

a trained speed detection model; or a trained loop detection model.

10. The method of claim 1, further comprising:

partitioning the video into the one or more video segments by computing an amount of change between every pair of two consecutive frames of the video; and defining a start frame of a video segment when the computed amount of change exceeds a defined scene change threshold.

11. The method of claim 1, further comprising:

prior to outputting the updated selected video segment as the customized video segment, detecting a region of interest (ROI) in the selected video segment; and zooming in on the ROI in the updated selected video segment.

12. The method of claim 1, further comprising:

prior to outputting the updated selected video segment as the customized video segment, defining a plurality of frames at a start of the updated selected video segment as variable start frames or defining a plurality of frames at an end of the updated selected video segment as variable end frames; and outputting the customized video segment to have a variable length, wherein the variable length is variable based on a random selection of one of the variable start frames as a first frame of the customized video segment or a random selection of one of the variable end frames as a last frame of the customized video segment.

13. The method of claim 1, wherein the customized video segment is outputted in an animated GIF format.

14. A computing device comprising:

a processing unit configured to execute instructions to cause the computing device to perform a method comprising:

computing, for each respective video segment of one or more video segments of the video, each video segment having two or more frames, a respective set of scores, each score representing a respective content feature in the respective video segment;

receiving, from a user device, user input including a selection of one or more user-selected weight values to be applied to each respective set of scores;

computing a respective weighted aggregate score for each respective video segment by applying, to each respective set of scores, a common set of weight values including the user-selected one or more weight values; selecting a selected video segment as the customized video segment, the selected video segment being selected from one or more high-ranked video segments having high-ranked weighted aggregate scores;

receiving, from the user device, a changed user input that causes the common set of weight values to change to a changed common set of weight values;

recomputing the respective weighted aggregate score for each respective video segment using the changed common set of weight values;

selecting an updated selected video segment as the customized video segment, based on the updated selected video segment being one of one or more reranked video segments having high-ranked recomputed weighted aggregate scores; and outputting the updated selected video segment as the customized video segment.

15. The computing device of claim 14, wherein the instructions cause the computing device to perform the method further comprising:

receiving, from the user device, further user input including a user-submitted query;

comparing a query feature vector representing features of the user-submitted query with a respective video segment feature vector representing features of each respective high-ranked reranked video segment; and selecting the reranked video segment represented by the video segment feature vector having a highest similarity with the query feature vector as the updated selected video segment.

16. The computing device of claim 14, wherein the instructions cause the computing device to perform the method further comprising:

prior to receiving the changed user input, providing output to the computing device to cause the computing device to provide a preview of the selected video segment together with a visual indication of the weighted aggregate score for the selected video segment; and after selecting the updated selected video segment, updating the preview based on the updated selected video segment and updating the visual indication based on the recomputed weighted aggregate score.

17. A non-transitory computer readable medium storing instructions thereon, wherein the instructions are executable by a processing unit of a computing device to cause the computing device to perform a method comprising:

computing, for each respective video segment of one or more video segments of the video, each video segment having two or more frames, a respective set of scores, each score representing a respective content feature in the respective video segment;

receiving, from a user device, user input including a selection of one or more user-selected weight values to be applied to each respective set of scores;

computing a respective weighted aggregate score for each respective video segment by applying, to each respective set of scores, a common set of weight values including the user-selected one or more weight values;

selecting a selected video segment as the customized video segment, the selected video segment being selected from one or more high-ranked video segments having high-ranked weighted aggregate scores;

receiving, from the user device, a changed user input that causes the common set of weight values to change to a changed common set of weight values;

recomputing the respective weighted aggregate score for each respective video segment using the changed common set of weight values;

selecting an updated selected video segment as the customized video segment, based on the updated selected video segment being one of one or more reranked video segments having high-ranked recomputed weighted aggregate scores; and outputting the updated selected video segment as the customized video segment.

18. The non-transitory computer readable medium of claim 17, wherein the instructions cause the computing device to perform the method further comprising:

receiving, from the user device, further user input including a user-submitted query;

comparing a query feature vector representing features of the user-submitted query with a respective video segment feature vector representing features of each respective reranked video segment; and selecting the reranked video segment represented by the video segment feature vector having a highest similarity with the query feature vector as the updated selected video segment.

19. The non-transitory computer readable medium of claim 17, wherein the instructions cause the computing device to perform the method further comprising:

prior to receiving the changed user input, providing output to the computing device to cause the computing device to provide a preview of the selected video segment together with a visual indication of the weighted aggregate score for the selected video segment; and after selecting the updated selected video segment, updating the preview based on the updated selected video segment and updating the visual indication based on the recomputed weighted aggregate score.

* * * * *